United States Patent Office 2,748,077
Patented May 29, 1956

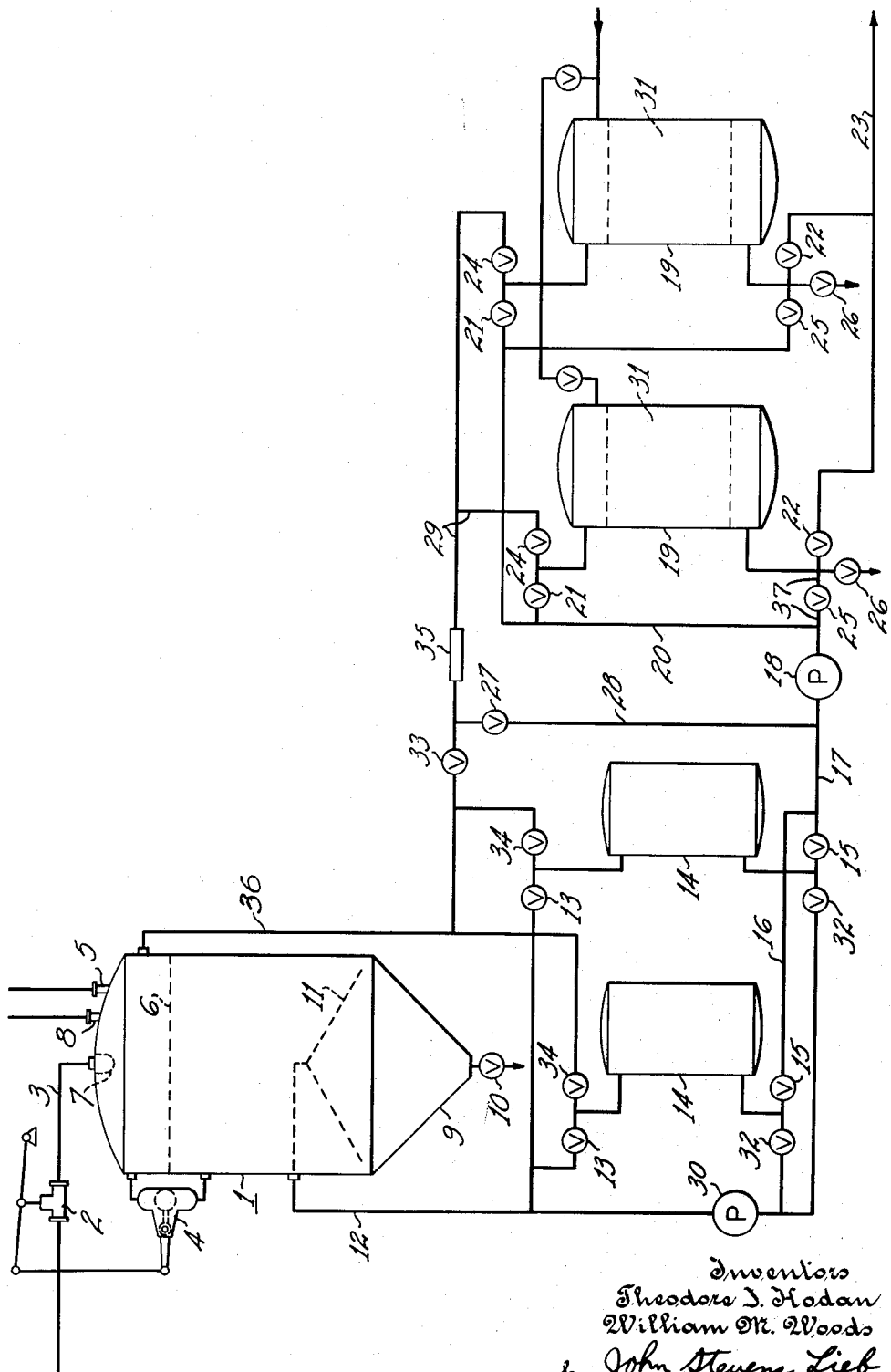

2,748,077

MEANS AND METHOD FOR BACKWASHING THE ZEOLITE IN A HOT LIME HOT ZEOLITE WATER SOFTENING SYSTEM

Theodore J. Hodan, Milwaukee, Wis., and William M. Woods, Oak Ridge, Tenn., assignors to Allis-Chalmers Manufacturing Company, Milwaukee, Wis.

Application October 8, 1952, Serial No. 313,741

4 Claims. (Cl. 210—24)

This invention relates generally to an improved means and method for redistributing the active ingredients in a water softener and for removing the sediment therefrom, and more specifically to an improved means and method for backwashing the active material of the zeolite bed of a hot lime hot zeolite water softener and for removing the sediment therefrom.

The term "hardness" as applied to water indicates the scale forming property of the water and its ability to destroy a standard soap test solution. The scale formed by hard water makes its appearance as a deposit on the surface of the water container and comprises mineral materials, dirt, and other impurities. Depending upon the chemical composition of the scale, water is classified as having either carbonate or noncarbonate hardness. The carbonate hardness is formed by bicarbonates of calcium and magnesium which forms a soft porous scale while the noncarbonate hardness is formed by sulfates of calcium and magnesium which forms a very hard scale. Water may be made less hard or "softened" by removing the carbonate and noncarbonate hardness from the water. Several methods of accomplishing softening which have heretofore been utilized are heating or boiling, treatment with lime, treatment with soda ash, treatment with both lime and soda ash, lime and barium, trisodium phosphate, and coagulants and zeolite or a combination of hot lime and hot zeolite.

The hot lime hot zeolite method of water softening is practiced in a softener apparatus or system comprising a water treating sedimentation tank into which raw water containing carbonate and noncarbonate hardness, lime (calcium hydroxide), and steam are admitted; a filter connected to the tank to receive the treated water from the tank, the treated water being partially devoid of carbonate hardness; and another tank containing materials known as synthetic zeolites into which the filtered water is discharged for removal of the remaining carbonate and noncarbonate hardness. A booster pump is normally interposed between the filter and the zeolite tanks to maintain the flow of water therebetween.

In normal operation, a certain amount of carbonate hardness is removed from the raw water in the water treating sedimentation tank. The partially softened water passes in a direction of forward flow from the tank to the filters which are normally designed to pass about 2 to 4 gallons per minute per square foot of filter area. The filtered partially softened water is led from the filters to a booster pump which passes the water to the zeolite softeners. The filtered partially softened water is acted on by the zeolite which substantially removes the remaining hardness in the water. The softened water is then discharged to a service supply.

After the aforementioned system has been in operation for a period of time, the sodium ion supply initially provided by the zeolite becomes depeted and the zeolite itself becomes saturated with impurities and sediment. When this depletion and saturation occurs, the zeolite bed becomes ineffective and no longer removes the hardness from the water. The zeolite bed is restored to activity by a generally three step process known as regeneration. The first step in this process is referred to as "backwashing" the zeolite bed and is accomplished by passing filtered lime softened water through the bed in a direction which is the reverse of the normal flow through the bed. This reverse flow redistributes the material in the bed, removes channels or paths of low hydraulic resistance, and places in suspension in the water any sediment or material clinging to the bed. The second step in the process is known as "brining" and is accomplished by forcing brine through the zeolite bed in a direction of forward flow and discharging the brine from the system. The second step regenerates the zeolite by restoring sodium to it. The third and last step is a rinsing operation and is accomplished by passing filtered lime softened water in a direction of forward flow through the zeolite bed and discharging the rinsing water from the system. This last step rinses the zeolite free from released hardness and excess salt.

As hereinbefore mentioned, th first step consists of the conventional zeolite backwash which involves a flow from the sedimentation tank outlet through the filters, through the zeolite unit in a reverse direction, and back to the sedimentation tank. This conventional method of backwashing has the following disadvantages.

In the conventional system, additional filter capacity, as expressed in filter area over and above that needed for the service flow or net output of the system, is required. The service flow rate through a square foot of zeolite bed is generally held to 5 to 6 gallons per minute per square foot of bed. On the other hand, the backwash rate is generally 10 to 15 gallons per minute per square foot of area. Filters designed for use with water purifying systems will generally handle a maximum flow of only 2 or 4 gallons per minute per square foot of filter area, and many filter specifications require the maximum flow to be limited to not more than 2 gallons per minute per square foot of filter area. Therefore, it is necessary to provide 3 to 7 times the filter area compared to the zeolite area to maintain the desired rate of backwash flow through the zeolite bed. The backwashing operation requires a relatively short period of time (10 to 15 minutes). It is only during the short period of backwashing that the high filter capacity is utilized and for the remainder of the softening operation only about one-half of the filter capacity is utilized.

In a given installation of the conventional system, an economic balance must be struck between the number of filters, the number of zeolite tanks, and the amount of available floor space. The total zeolite area required is dependent upon the amount of softened water desired. Once the desired quantity of softened water is established, the zeolite area may be determined and it may be divided among two, three or more units.

When the zeolite area is subdivided into many small units (as contrasted to a few large units providing the same area), less filter area is needed and, consequently, less filters are needed. The amount of filter area required for backwashing a given zeolite softener is, as herein before described, dependent upon the capacity of back flow through the zeolite softener. It is obvious, therefore, that a reduction of the flow capacity of a single zeolite softener by reducing its area will also enable a reduction of the filter area required to backwash that filter. The multiple unit zeolite softening zone further reduces idle filter area since the individual zeolite units may be backwashed one at a time, thereby keeping the extra filter area "at work" by connecting it to one or another of the zeolite units.

On the other hand, the foregoing arrangement has its disadvantages. The subdivision of the zeolite area into many small units increases the cost of the installation.

The cost of the many small filter units exceeds the cost of fewer large filter units for providing the same filter area because many structural parts, such as housings etc., are duplicated which would need not be duplicated if fewer large units were used. The duplication of zeolite softener installation equipment such as pipes, valves, etc., so many of which are required per individual zeolite unit regardless of its size, further adds to the cost of this type of installation. Subdivision of the zeolite area into multiple units saves filter area, but the multiple units take more floor space than one or two larger zeolite units. In an existing building where the floor space may be limited, the proper balance between the filters, zeolite units and floor space for best results presents a knotty problem.

In the conventional system, the addition of hot zeolite units to an existing treating plant having already in place the lime softener sedimentation tank and the filters creates certain difficulties. In the existing plant, the total filter area is enough to take care of the net output or service flow only. The addition of hot zeolite units to the filters of such a plant requires that either additional filter capacity be provided to take care of the zeolite backwash requirements, or the rate of filtration of flow be increased during zeolite backwash. In the one case the added filters must be the same size, i. e., have the same filter area as the existing filters in order to maintain operating and hydraulic balance among the filters. This involves the use of more filter area than is necessary, and in any event the extra cost and floor space makes the modification undesirable. In the other case an increased filtration flow rate causes high pressure losses and poor filter performance.

In the conventional system, the chemical unbalance that results from recycling the zeolite backwash water back to the lime softener sedimentation tank is disadvantageous. When the system is operating in its normal manner and the liquid is flowing forward through the zeolite bed, the quantity of lime introduced in the water softening sedimentation tank is determined by test. The quantity of lime introduced should be slightly in excess of that amount required to react completely with all of the bicarbonate hardness in the raw water. This slightly excess is desirable since it enables the chemical reaction within the sedimentation tank to reach chemical equilibrium. The test can, of course, be conducted during any part of the operation as a check upon reaction equilibrium. If a subsequent check test indicates the lime content to be low, additional lime can be added to restore the chemical reaction in the tank to its equilibrium or steady state. That is, the rate of lime addition to the tank will be in balance with the rate of bicarbonate hardness added by way of the raw water and the chemical composition of the effluent will be maintained substantially constant. The tank effluent contains dissolved calcium carbonate $CaCO_3$, and excess lime, $Ca(OH)_2$. When the effluent is passed through the zeolite bed during backwash of the zeolite, the calcium salts are converted to sodium salts, that is to sodium carbonate, $Na_2CO_3$, and sodium hydroxide, $NaOH$. When the backwash water is returned to the water softening sedimentation tank, it is brought into contact with finely divided solid calcium carbonate, $CaCO_3$, and immediately becomes resaturated with respect to the calcium carbonate, $CaCO_3$. This calcium carbonate, $CaCO_3$, reacts with the sodium hydroxide, $NaOH$, to reform lime, $Ca(OH)_2$, and soda ash, $Na_2CO_3$, in accordance with the chemical equation

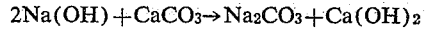

$$2Na(OH) + CaCO_3 \rightarrow Na_2CO_3 + Ca(OH)_2$$

The amount of soda ash, $Na_2CO_3$, formed is a function of the length of time the zeolite softener is backwashed. The formation and appearance of this soda ash in the sedimentation tank upsets the equilibrium of the process in the tank each time a zeolite softener is backwashed, and the upset in equilibrium persists for a considerable period afterward. Since one of the purposes of the hot lime hot zeolite process is to remove carbonate alkalinity, the indirect addition of soda ash during a zeolite backwash partly interferes with this removal.

One means heretofore proposed to minimize the chemical unbalance resulting from returning the backwash to the top of the sedimentation tank is to return the backwash at a point in the tank near the outlet, for example, at a point beneath the uptake cone. This prior art means has been only partly successful because soda ash, $Na_2CO_3$, is still formed in the region of the outlet and in the filters and piping.

This invention proposes to provide a method and apparatus for backwashing a zeolite softener which will in effect isolate the sedimentation tank and filters from the zeolite softeners during the backwashing operation to permit successful backwashing of the zeolite softener without any adverse physical or chemical effect on the sedimentation tank and filters.

It is therefore an object of the present invention to provide an improved means and method for backwashing the zeolite softener in a hot lime hot zeolite system to obviate the aforementioned disadvantages of the conventional backwash arrangement. Objects and advantages other than those set forth will be apparent from the description when read together with the accompanying drawing.

The following is a full, clear and exact description of the apparatus and method according to the present invention. In the drawing a type of water conditioning apparatus known as a hot lime hot zeolite softener system is illustrated schematically and represents not only an embodiment of the invention but also apparatus for practicing the process of the invention.

In this illustrated system hard water is admitted to the sedimentation tank 1, which is of the down flow type, through valve 2 and conduit 3 from a source of hard water not shown. Although the down flow type of sedimentation tank is illustrated, other types of sedimentation tanks, such as the sludge blanket type, may be substituted for the tank shown. A proper water level is maintained in the sedimentation tank 1 by the action of the float cage 4 in cooperation with valve 2. Steam is admitted to the sedimentation tank 1 through the steam inlet 5 to maintain a suitable steam pressure above the water level 6 in the sedimentation tank 1. The hard water is sprayed into tank 1 by means of the spray nozzle 7 and is heated by contact with the steam in the tank. The proper chemicals in liquid form in proportion to the volume flow of hard water are introduced into tank 1 through connection 8 by means not shown.

The softening chemicals are generally lime or dolomitic lime in slurry form with or without a coagulant such as sodium aluminate, although other chemicals may be used. Assuming that lime is used, the lime reacts with the bicarbonate hardness in the water to precipitate calcium carbonate in accordance with the chemical equation $$Ca(HCO_3)_2 + Ca(OH)_2 \rightarrow 2CaCO_3 + 2H_2O$$

and with the magnesium hardness to precipitate magnesium hydroxide in accordance with the chemical equation $$Mg(HCO_3)_2 + 2Ca(OH)_2 \rightarrow Mg(OH)_2 + 2CaCO_3 + 2H_2O$$

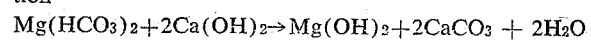

The removal of the carbonate and hydroxide from solution both reduces the hardness and the bicarbonate alkalinity. The precipitated solids for the most part settle into a sludge cone 9 at the bottom of tank 1 and are periodically removed through valve 10. The lime softened water is collected from under uptake cone 11 and leaves the sedimentation tank 1 by way of first conduit 12 and passes through valves 13 to the filters 14 for removal of unsettled solids.

The filtered lime softened water passes from the filters 14 through valves 15 and second conduit 16, 17 to the booster pump 18. The booster pump 18 forces the filtered lime softened water through the zeolite softeners 19 to supply or service lines, not shown, by way of third conduit 20, open valves 21 and 22 and conduit 23. During the described forward flow through the system, valves 24, 25, 26 and 27 are closed. With valve 27 closed, no flow takes place in sixth conduit 28 interconnecting conduit 17 with fifth conduit 29 which connects the inlet of the zeolite softeners 19 to the inlet of a valve 33. Seventh conduit 36 interconnects the outlet of valve 33 to the sedimentation tank 1. The fifth and seventh conduits 29, 36 and valve 33 form a return from the inlet of the softeners 19 to the sedimentation tank 1 for the backwash water during conventional backwashing of the softeners 19.

Pump 30 is a filter backwash pump operative only for periodic cleaning of the filters. In a filter cleaning operation, pump 30 draws lime softened water from sedimentation tank 1 through conduit 12 and forces the water in an upflow or reverse flow direction through the filter 14 to the sedimentation tank 1 by way of open valves 32 and 34 and seventh conduit 36, valves 13, 15, and 33 being closed.

The zeolite softeners 19 are of conventional design, being closed tanks equipped with distributor and collector means in top and bottom and partly filled with a granular or particulate bed 31 of active zeolite resin material.

Although the number of zeolite softeners shown in the drawing is limited to two, any number of softeners may be used, depending upon the quantity of water to be softened and the economies of the particular situation. The same is true for the number of filters.

The filtered lime softened water that passes to the zeolite softeners 19 along conduits 16, 17 and 20 is not completely soft since it still has all of the original non-carbonate hardness plus the hardness equivalent to the solubility of calcium carbonate, $CaCO_3$, under the pertaining conditions of pH, temperature, etc. At this point, the water is clear and hot, and a reduction has been made in hardness, bicarbonate alkalinity and possibly silica. The water is further softened by passage through the zeolite bed 31 in the softeners 19 by a chemical exchange reaction in which the zeolite bed 31 absorbs hardness from the water while giving up to the water an equivalent amount of sodium in accordance with the chemical formula

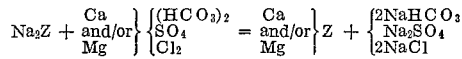

Periodically the zeolite bed 31 becomes depleted in sodium so that the chemical reaction stops and the hardness passes to the service lines. During the softening cycle a small amount of suspended solids which have escaped the filters 14 collects on top of the zeolite bed 31. The zeolite bed 31 "packs" to some degree and channels or paths of low hydraulic resistance develop so that some of the water tends to short circuit from inlet to outlet without fully contacting the material in the zeolite bed 31.

The zeolite bed 31 is brought back to a condition for further useful softening by the three step process of "regeneration."

This invention is concerned with the first step in this process, the step known as backwashing the zeolite softener, and is further concerned with a novel combination of apparatus to accomplish this step.

The backwashing step in the regeneration of one or more of the zeolite softeners 19 involves washing the zeolite bed of the softener by passing lime softened water through the bed 31 in a reverse or upflow direction. In the conventional backwash step, the lime softened water is passed in an upflow direction through the zeolite softener 19, fifth conduit 29, seventh conduit 36 and valve 33 to the sedimentation tank 1. In the backwash step of this invention, use is made of the sixth conduit 28 connected between a portion of second conduit 17 and fifth conduit 29, to shunt the softeners 19, and form a closed circuit from the outlet of the softeners back to their inlet through the pump 18. The valve 27 interposed in sixth conduit 28 and the valve 33 interposed between fifth conduit 29 and seventh conduit 36 are so positioned that when valve 27 is closed and valve 33 opened, the backwash water will flow to the sedimentation tank 1, and when valve 33 is closed and valve 27 opened the backwash water will flow to the inlet portion of the booster pump 18. In operation of the backwash cycle, the lime softened filtered water from pump 18 is admitted to the inlet of the zeolite unit 19 through a fourth conduit 37 and valve 25. This water flows upward through the bed and leaves the zeolite unit through valve 24. During this backwash flow valves 21, 22, 26 and 33 are closed, and valve 27 is open. The zeolite backwash water is returned to the suction of pump 18 and recirculates through the unit being backwashed. Since pump 18 also supplies influent water to the unit (or units) which are in softening operation, any suspended material washed off the bed 31 of the one unit either distributes itself on the beds of the softening units 19 or goes into solution.

The amount of suspended material that accumulates on the zeolite bed is small, so that backwashing in a closed cycle at regular intervals over a period of several months satisfactorily removes deposits from the zeolite bed. However, continued operation over very long periods with only the recycle backwash may result in excessive accumulations of suspended solids on the tops of the zeolite beds 31 so that it may be desirable to employ the conventional backwash at the end of a long period. For example, the backwash water will be returned to the sedimentation tank, or else discharged from the system at such times as it may be necessary. A sight glass 35 may be interposed in conduit 29 to enable the operator to determine by the appearance of the backwash water when the conventional backwash should be made or the determination may be made by other well known means.

A slight chemical unbalance in the zeolite softeners 19 occurs during the recycle backwash, but chemical balance is restored quickly after backwash is stopped. The slight chemical unbalance in the zeolite softeners does not affect the chemical balance in the water treating sedimentation tank 1 and filters 14 when forward flow through the system is restored by reconnecting the softener 19 to the filters 14 and closing valve 27 because the sodium salts formed when the backwash water passes through the zeolite bed 31 are not returned to the sedimentation tank 1. The failure to return the backwash water to the sedimentation tank 1 prevents the aforementioned sodium salts from reacting with the calcium carbonate to form soda ash. As mentioned heretofore, it is the formation and appearance of soda ash that upsets the equilibrium of the softening process in the tank.

In the recycle backwash, the zeolite softened wash water does not pass through the filters. The filters required therefore need to have only sufficient area to handle the service flow. Further, the areas of the individual zeolite units can be proportioned as desired without regard to the filter area, since filter area is not a factor in the determination of the areas of the zeolite units when the present invention is practiced. It is only necessary to provide a pump (or pumps) (18) of sufficient capacity to supply the required amount of zeolite wash water plus service flow.

It will be apparent that the process and apparatus described herein will be susceptible to minor variations in practice and modified in detail without departing from the spirit of the invention. The invention accordingly includes such modification and variations as may reasonably be considered within the scope of the appended claims.

It is claimed and desired to secure by Letters Patent:

1. In a hot lime hot zeolite oftener apparatus the combination of a sedimentation tank for partially removing carbonate hardness from raw water, said tank having an inlet for raw water and an outlet for water partially devoid of carbonate hardness, a filter having an inlet and an outlet, a first conduit connecting the outlet of said tank to the inlet of said filter for carrying said water partially devoid of carbonate hardness to said filter, a booster pump having an inlet and an outlet, a second conduit connecting the outlet of said filter to the inlet of said pump, a zeolite softener having an inlet and an outlet, a third conduit connecting said outlet of said pump to said inlet of said softener; a first valve connected in series with said third conduit for controlling the admission of said water partially devoid of carbonate hardness to said softener; a fourth conduit connecting said outlet of said pump to said outlet of said softener; a second valve connected in series with said fourth conduit; a fifth conduit connected to said inlet of said softener; a sixth conduit connected to the inlet of said pump; a third valve connecting said fifth conduit to said sixth conduit; and a fourth valve for connecting said outlet of said zeolite softener to a soft water main, whereby said pump is operable when said first and fourth valves are open and said second and third valves are closed to cause said water partially devoid of carbonate hardness to flow from said tank through said first conduit, said filter, said second conduit, said pump, said third conduit, said first valve, through said zeolite softener in one direction where said water is completely softened, and said fourth valve to said soft water main, said pump being operable when said second and third valves are open and said first and fourth valves are closed to cause said water partially devoid of carbonate hardness to circulate through said fifth conduit, said third valve, said sixth conduit, said pump, said second valve, said fourth conduit, and said zeolite softener in the opposite direction for a time interval sufficient to eliminate channels of nonuniform hydraulic resistance in the zeolite bed in said zeolite softener by lifting and hydraulically classifying said bed and to put in suspension solid material deposited on said bed.

2. In a hot lime hot zeolite softener apparatus the combination of a sedimentation tank for partially removing carbonate hardness from raw water, said tank having an inlet for raw water and an outlet for water partially devoid of carbonate hardness, a filter having an inlet and an outlet, a first conduit connecting the outlet of said tank to the inlet of said filter for carrying said water partially devoid of carbonate hardness to said filter, a booster pump having an inlet and an outlet, a second conduit connecting the outlet of said filter to the inlet of said pump, a zeolite softener having an inlet and an outlet, a third conduit connecting said outlet of said pump to said inlet of said softener; a first valve connected in series with said third conduit for controlling the admission of said water partially devoid of carbonate hardness to said softener; a fourth conduit connecting said outlet of said pump to said outlet of said softener; a second valve connected in series with said fourth conduit; a fifth conduit connected to said inlet of said softener; a sight glass connected in series with said fifth conduit for observing the condition of the water flowing through said fifth conduit; a sixth conduit connected to the inlet of said pump; a third valve connecting said fifth conduit to said sixth conduit; and a fourth valve for connecting said outlet of said zeolite softener to a soft water main, whereby said pump is operable when said first and fourth valves are open and said second and third valves are closed to cause said water partially devoid of carbonate hardness to flow from said tank through said first conduit, said filter, said second conduit, said pump, said third conduit, said first valve, through said zeolite softener in one direction where said water is completely softened, and said fourth valve to said soft water main, said pump being operable when said second and third valves are open and said first and fourth valves are closed to cause said water partially devoid of carbonate hardness to circulate through said fifth conduit, said sight glass, said third valve, said sixth conduit, said pump, said second valve, said fourth conduit, and said zeolite softener in the opposite direction for a time interval sufficient to eliminate channels of nonuniform hydraulic resistance in the zeolite bed in said zeolite softener by lifting and hydraulically classifying said bed and to put in suspension solid material deposited on said bed.

3. In a hot lime hot zeolite softener apparatus the combination of a sedimentation tank for partially removing carbonate hardness from raw water, said tank having an inlet for raw water and an outlet for water partially devoid of carbonate hardness, a filter having an inlet and an outlet, a first conduit connecting the outlet of said tank to the inlet of said filter for carrying said water partially devoid of carbonate hardness to said filter, a booster pump having an inlet and an outlet, a second conduit connecting the outlet of said filter to the inlet of said pump, a zeolite softener having an inlet and an outlet, a third conduit connecting said outlet of said pump to said inlet of said softener; a first valve connected in series with said third conduit for controlling the admission of said water partially devoid of carbonate hardness to said softener; a fourth conduit connecting said outlet of said pump to said outlet of said softener; a second valve connected in series with said fourth conduit; a fifth conduit connected to said inlet of said softener; a sight glass connected in series with said fifth conduit for observing the condition of the water flowing through said fifth conduit; a sixth conduit connected to the inlet of said pump; a third valve connecting said fifth conduit to said sixth conduit; a seventh conduit connecting said fifth conduit to said tank; a fourth valve for connecting said outlet of said zeolite softener to a soft water main; and a fifth valve connected in series with said seventh conduit whereby said pump is operable when said first and fourth valves are open and said second, third and fifth valves are closed to cause said water partially devoid of carbonate hardness to flow from said tank through said first conduit, said filter, said second conduit, said pump, said third conduit, said first valve, through said zeolite softener in one direction where said water is completely softened, and said fourth valve to said soft water main, said pump being operable when said second and third valves are open and said first, fourth and fifth valves are closed to cause said water partially devoid of carbonate hardness to circulate through said fifth conduit, said sight glass, said third valve, said sixth conduit, said pump, said second valve, said fourth conduit, and said zeolite softener in the opposite direction for a time interval sufficient to eliminate channels of nonuniform hydraulic resistance in the zeolite bed in said zeolite softener by lifting and hydraulically classifying said bed and to put in suspension solid material deposited on said bed, said pump being operable when said second and fifth valves are open and said first, third and fourth valves are closed to cause said water partially devoid of carbonate hardness to circulate through said fifth conduit, said sight glass, said fifth valve, said seventh conduit, said sedimentation tank, said first conduit, said filter, said second conduit, said pump, said second valve, said fourth conduit and said zeolite softener in said opposite direction to remove said solid material from said zeolite softener.

4. The method of treating water in a hot lime hot zeolite softening apparatus comprising the steps of: establishing a flow of said water through a plurality of zones; adding lime to said water in a lime softening zone to partially reduce the carbonate hardness of said water; filtering the lime softened water in a filtering zone; passing one part of the filtered lime softened water from the filtering zone in the normal forward direction through a first ion exchange zeolite softening zone to complete the softening of said part of said water; simultaneously passing the remainder of the lime softened water through a second ion exchange zeolite softening zone in the direction reverse of the normal forward direction to backwash said second ion exchange zeolite softening zone for a time interval sufficient to eliminate channels of nonuniform hydraulic resistance and to carry off suspended material in said second zone; returning a part of the backwash water leaving said second zone to said second ion exchange zeolite softening zone; and passing the remainder of said backwash water through said first ion exchange softening zone.

References Cited in the file of this patent

UNITED STATES PATENTS

| | | |
|---|---|---|
| 1,305,123 | Kriegsheim | May 27, 1919 |
| 2,192,451 | Moore | Mar. 5, 1940 |
| 2,206,691 | Furness et al. | July 2, 1940 |
| 2,312,570 | Meir | Mar. 2, 1943 |
| 2,355,561 | Robinson | Aug. 8, 1944 |
| 2,379,753 | Sebald | July 3, 1945 |
| 2,407,180 | Schiller et al. | Sept. 3, 1946 |
| 2,412,328 | Felsecker | Dec. 10, 1946 |
| 2,460,036 | Sebald | Jan. 25, 1949 |

FOREIGN PATENTS

| | | |
|---|---|---|
| 115,843 | Australia | Sept. 24, 1942 |

OTHER REFERENCES

Power Generation, vol. 53, No. 10, Oct. 1949, pp. 75 and 76.

Permutit Water Treating Equipment Publication, The Permutit Co., 440 Fourth Avenue, New York, N. Y., 1932, p. 20.